United States Patent [19]

Bauer

[11] Patent Number: 4,680,847

[45] Date of Patent: Jul. 21, 1987

[54] METHOD OF PRODUCING A SPRING PLATE

[75] Inventor: Friedrich Bauer, Vienna, Austria

[73] Assignee: ENFO Grundlagenforschungs AG, Döttingen, Switzerland

[21] Appl. No.: 859,697

[22] Filed: May 5, 1986

Related U.S. Application Data

[62] Division of Ser. No. 664,969, Oct. 26, 1984, abandoned.

[30] Foreign Application Priority Data

Oct. 31, 1983 [AT] Austria ................................ 3856/83

[51] Int. Cl.⁴ ............................................ B21D 53/00
[52] U.S. Cl. ...................................... 29/173; 72/339; 72/402; 72/324
[58] Field of Search ................... 29/173; 72/402, 324, 72/329, 336, 339; 267/158-165, 167, 147, 80, 110, 107; 192/89 B

[56] References Cited

U.S. PATENT DOCUMENTS

| Re. 13,699 | 3/1914 | Denis | 267/161 |
| 404,284 | 5/1889 | Johnson | 267/161 |
| 2,725,964 | 12/1955 | Maurer | 192/89 B |
| 2,860,869 | 11/1958 | Utvitch | 29/173 |
| 3,237,739 | 3/1966 | Pritchard | 267/161 |
| 3,389,642 | 6/1968 | Robinette | 267/161 |
| 3,430,458 | 3/1969 | Titt | 29/173 |
| 3,668,917 | 6/1972 | Komatsu et al. | 29/173 |
| 4,582,186 | 4/1986 | Bauer | 192/89 B |

FOREIGN PATENT DOCUMENTS

| 1073148 | 9/1954 | France | 267/161 |
| 1475831 | 2/1967 | France | 267/161 |

Primary Examiner—Daniel C. Crane
Attorney, Agent, or Firm—Watson, Cole, Grindle & Watson

[57] ABSTRACT

A spring plate for transmitting or storing forces is made of plates of material by punching and has radial webs connected in meander form by peripheral bridges. The radial webs between successive bridges are separated by narrow slots whose width, measured when the spring plate is in the flat state, is at least 10% less than the thickness of the spring-plate material, so that a maximum number of radial webs can be accommodated round the periphery of the spring plate.

3 Claims, 5 Drawing Figures

METHOD OF PRODUCING A SPRING PLATE

This application is a divisional application of application Ser. No. 664,969, filed Oct. 26, 1984, now abandoned.

BACKGROUND OF THE INVENTION

1. Field of the Invention

The invention relates to a spring plate for transmitting or storing forces, e.g., when actuating multiple-disc clutches, the spring plate being produced from plates of material by punching and having radial webs inter-connected in meander form by peripheral bridges. The invention also relates to a method of producing such a spring plate and a device for working the method.

2. Description of Prior Art

Known spring plates of this type are made of spring steel formed with radial grooves extending alternately from the inner edge and the outer edge of the plate. The resulting radial webs are stressed by bending when transmitting forces. In order to transmit sufficiently large forces and withstand the resulting bending stresses, the spring plates must be made relatively thick. As a result, known spring plates, e.g., cup springs, are relatively stiff. The resulting resistance to deformation has to be additionally overcome when transmitting forces, thus increasing the force required for actuation.

SUMMARY OF THE INVENTION

According to the invention, there is provided a spring plate for transmitting or storing forces, the spring plate having radial webs interconnected in meander form by peripheral bridges, the radial webs at least at the inner edge of the spring plate being separated from one another between successive bridges by narrow slots whose width, measured when the spring plate is unstressed, is at least 10% less than the thickness of the spring-plate material. It is thus possible to provide a spring plate whose resistance to deformation is appreciably reduced without affecting its strength or service life.

In a preferred embodiment, adjacent radial webs are close together so that the available space can accommodate a large number of webs and a correspondingly large number of meanders. The spring plate may therefore be soft, although the radial webs themselves are relatively thick. Since there are a number of relatively thick webs, large forces can be transmitted, but the resistance to deformation of the spring plate remains small and the stresses on the material are low, even in the web cross-sections and the connecting bridges. Consequently such a lever plate also has an unusually long life. It may advantageously be used for transmitting relatively large actuation forces, e.g., in multiple-disc clutches, or can also serve as a simple spring, e.g., a cup spring. In a preferred embodiment of the spring plate, the slots between the adjacent bridges at the outer edge are narrower than the thickness of the spring-plate material and the distance between adjacent webs connected by bridges at the inner edge and at the outer edge is the same as or greater than the thickness of the spring-plate material at the respective region. This optimizes the design, making best use of the available space.

Adjacent radial webs extending from the slots may include an acute angle with one another and extend in a straight line to the outer edge of the spring plate. This construction facilitates manufacture and, owing to the straight webs, also improves the transmission of forces.

Such a spring plate can be produced by cutting out by laser technology or by electro-erosion or by etching or similar machining processes. Since the slots between adjacent webs are narrower than the thickness of the material, the spring plate cannot be produced directly by a simple punching operation. According to another aspect of the invention, there is provided a method of producing a spring plate according to the invention, in which a rough plate is punched to produce radial webs and meander-offset bridges with the slots between the webs being wider than the thickness of the material, and the rough plate is then shaped by radial compression to form the finished spring plate with narrow slots between the webs. The plate may thus be shaped by a well-tried punching process followed by a simple bending process, which can be carried out with relatively simple machinery.

The spring plate may be flat when in the relaxed state. Alternatively, it may be manufactured as a cup spring if the rough plate is shaped into a cup during radial compression or immediately thereafter, thus producing a non-flat spring plate, as used e.g., for the springs in valves and the like.

According to a further aspect of the invention, there is provided a device for performing a method according to the invention, in which a shaping ring divided into sectors is provided for receiving the rough plate and has a raised projection which engages the outer edge of the rough plate, the outer edge of the shaping ring having a conical guide surface arranged to be guided by a conical inner surface of an axially movable shaping punch. The larger-diameter rough plate produced by punching is simply inserted in the shaping ring, which is then radially compressed by pressing down the shaping punch, so that the diameter of the rough plate is reduced to form a correspondingly smaller spring plate. The shaping operation can be performed when cold, more particularly when the spring plate is subsequently hardened, or when hot.

To prevent the rough plate corrugating during shaping, a tension member may hold the rough plate on the shaping ring and resiliently bear against the punch.

The bearng surface for the rough plate on the shaping ring may be made conical and the shaping punch may contain an inner punch which is axially movable relative to the bearing surface and has a coinical shaping surface extending parallel to the bearing surface. This device can advantageously be used to convert the spring plate into a cup shape at the same time as it is radially compressed. Other shaping is also possible. For example the spring plate can be corrugated, if the bearing surface and the shaping surface of the inner punch are suitably designed.

BRIEF DESCRIPTION OF THE DRAWINGS

The invention will be further described, by way of example, with reference to the accompanying drawings, in which.

DESCRIPTION OF THE PREFERRED EMBODIMENTS

Figure 1:
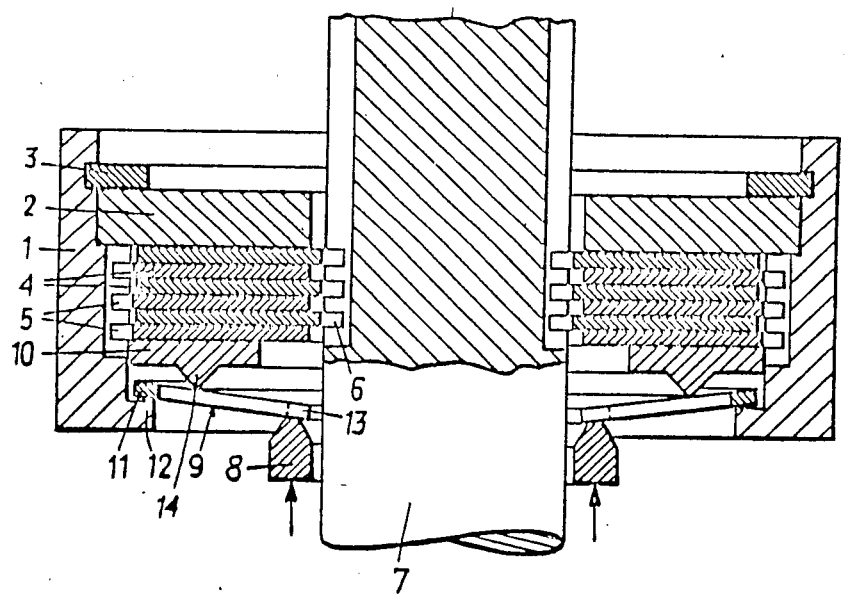
FIG. 1 is an axial central section through a multiple-disc clutch which includes a spring plate constructed according to a preferred embodiment of the invention.
Figure 2:
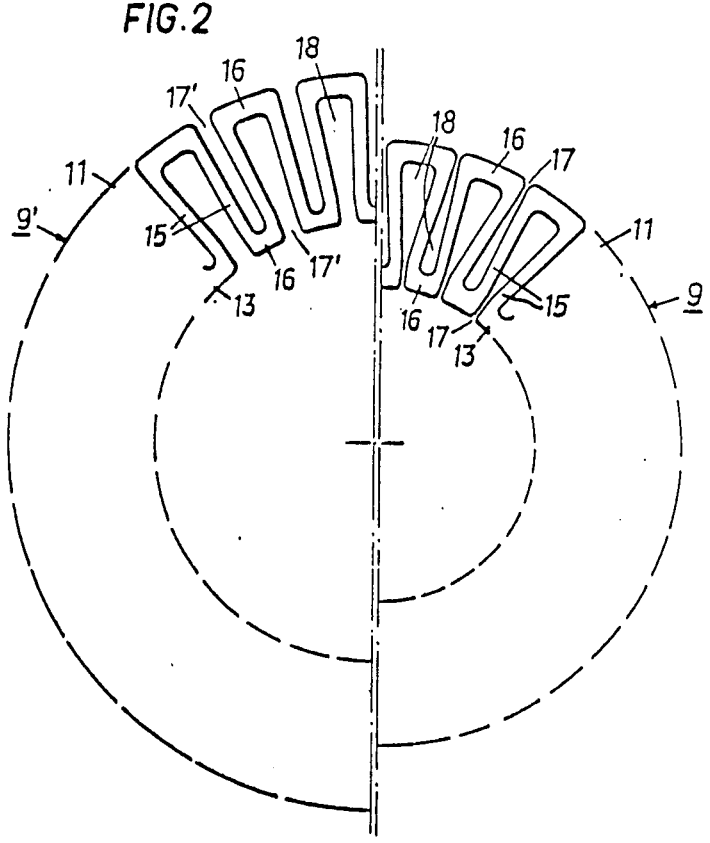
FIG. 2 is a plan view of the spring plate used in the clutch shown in FIG. 1 the rough plate being shown at the left and the finally-shaped spring plate being shown on the right.

FIG. 1 shows a multiple-disc clutch comprising a pot-shaped casing 1 closed by a circular cover 2 held in the casing 1 by a spring ring 3. A lamination stack 4 is disposed inside the casing 1, the laminations being toothed alternately at outer and inner edges. The laminations having external teeth 5 engage with corresponding teeth in the casing 1, whereas the laminations with internal teeth 6 are non-rotatably secured to a shaft 7 formed with correspondingly-shaped grooves. A thrust ring 8 is disposed concentrically around the shaft 7 and acts via a spring plate 9 on a pressure ring 10 which abuts the lamination stack 4. The outer edge 11 of the plate 9 bears on a shoulder 12 in the casing 1 whereas its inner edge 13 bears on the thrust ring 8. Between an inner edge 13 and the outer edge 11, a bead 14 of the ring 10 bears on the plate. As FIG. 2 shows, the spring plate 9 has radial webs 15, which have a generally uniform width along their length, interconnected alternately at the outer edge 11 and inner edge 13 by peripheral bridges 16. The result is a meander-like sequence of radial webs 15 and connecting bridges 16. The left half of FIG. 2 shows a "rough plate" 9' which is used in a shaping process to produce the finished spring plate 9 shown in the right half. The plate 9' likewise has radial webs 15 and peripheral bridges 16. The plate 9' differs from the plate 9 in that the slots 17' between adjacent webs 15 at the inner edge 13 and outer edge 11 are considerably wider than the slots 17 in the finished plate 9. The slots 17' in the plate 9' are wider, usually considerably wider, than the thickness of the material forming the plate 9 or 9', whereas an essential feature of the finished spring plate 9 is that the slots 17 are narrow, their width being at least 10% less than the thickness of the spring-plate material in the region of adjacent webs 15.

The narrow slots 17 provide room for a relatively large number of radial webs 15 for a given-diameter spring plate 9, so that the plate 9 is relatively soft but can transmit large forces. Another advantage of this embodiment is that the soft spring plate 9 can be deformed by only small forces, even when the radial webs 15 and bridges 16 are made relatively thick. Consequently, the plate 9 is particularly robust and long-lasting, even when subjected to alternating stresses.

As a result of the narrow slots 17, the plate 9 cannot be made by a simple punching operation. Firstly, therefore, the rough plate 9' is produced, since it can be punched without difficulty owing to the correspondingly wide slots 17'. Next, the rough plate 9' is radially compressed to form the finished spring plate 9 shown in the right half of FIG. 2. In this process, the substantially parallel radial webs 15 of the plate 9' are converted into the shape shown in the right half of FIG. 2, where they spread out at an acute angle from the slots 17. The bridges 16 are given a length such that the generally triangularly-shaped opening 18 enclosed by them and the webs 15 can be punched without difficulty.

Figure 3:
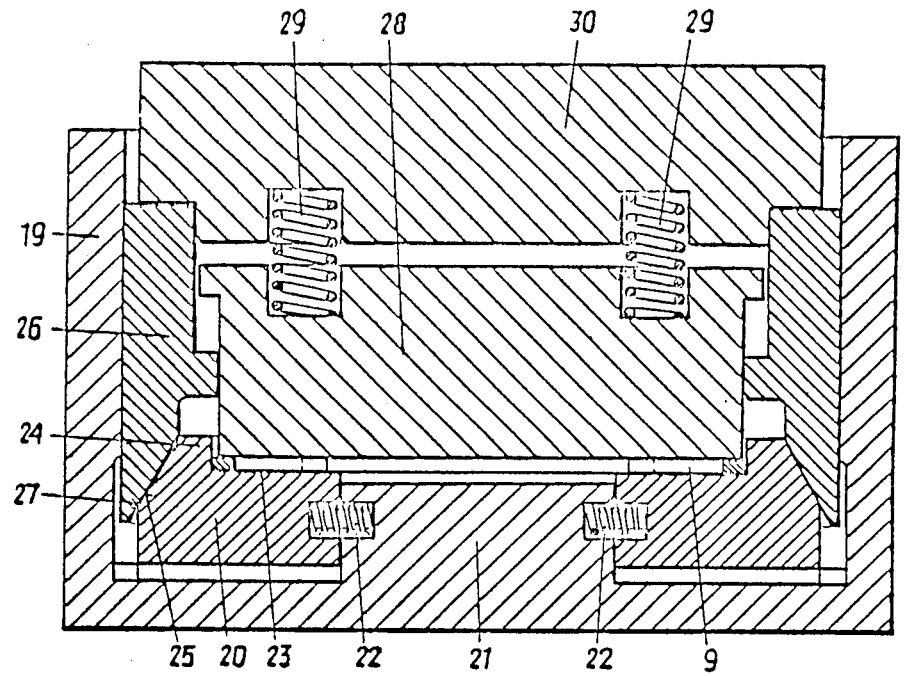
FIG. 3 is a diagrammatic axial central section through a device for producing a spring plate according to the invention.

FIG. 3 shows a device surrounded by a pot-shaped casing 19 at the bottom of which a shaping ring 20 is radially adjustable and is made up of individual sectors. The individual sectors are conically disposed around a central hub 21 at the bottom of the casing 19 and are radially outwardly loaded by springs 22. On the top side of the ring 20, the sectors form a bearing surface 23 for the rough plate 9' or the spring 9 produced from it. The outer edge of the surface 23 is surrounded by a raised projection 24 which externally abuts the spring plate 9. At the outer edge of the ring 20, its sectors form a conical guide surface 25 which co-operates with a shaping punch 26. The punch 26 is axially guidable in the casing 19 and has a conical inner surface 27 which slides on the conical guide surface 25, so that when the punch 26 is pressed downwards in the casing 19 the shaping ring 20 is compressed radially inwards. In the process, the rough plate 9' is converted from the shape shown in the left half of FIG. 2 to the finished spring plate 9 shown in the right half of FIG. 2. During the shaping process, a clamping member 28 holds plate 9 firmly on the bearing surface 23 of the ring 20. The member 28 bears via springs 29 on a pressure member 30 of the punch 26.

Figure 4:
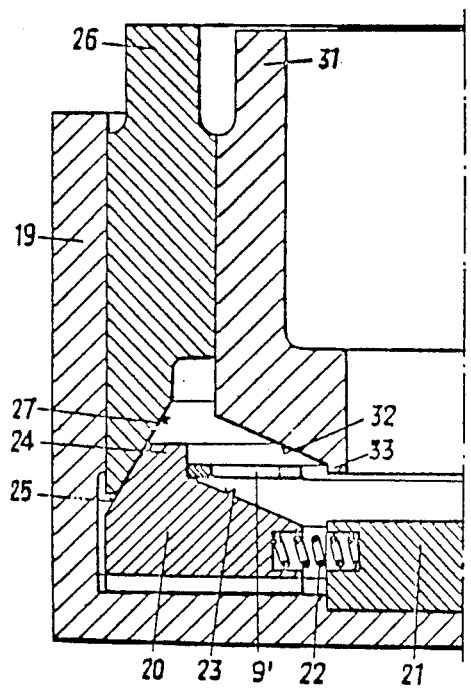
FIGS. 4 and 5 show a modification of the device of FIG. 3 partly in section and also diagrammatically.
Figure 5:
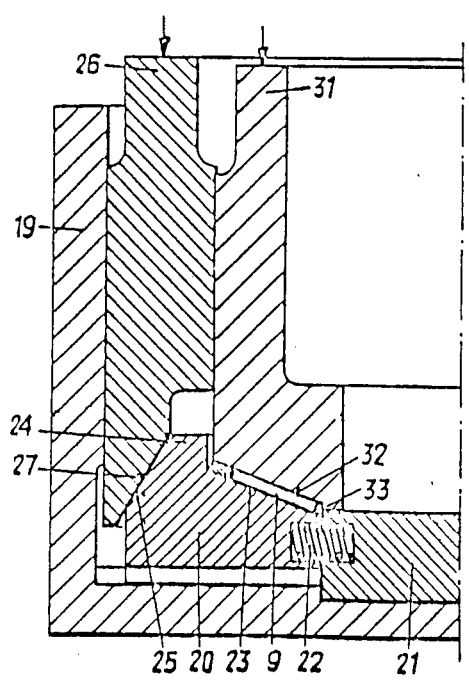

FIGS. 4 and 5 show a modification of the device in FIG. 3 in various operating positions. In this example, the bearing surface 23 of the ring 20 is made conical. Also, an inner punch 31 is axially movable inside the punch 26 and has a conical shaping surface 32 extending parallel to the surface 23. At its inner edge, the inner punch 31 has a downward projection 33 which during the shaping process forms an end abutment for the inner edge of the plate 9.

In the operating position shown in FIG. 4, the punches 26 and 31 are both in their top starting position. The rough plate 9' for shaping is placed in the ring 20, so that its outer edge bears against the projection 24. When the punch 26 is pressed downwards, the sectors of the ring 20 move radially inwards, so that the plate 9' is radially compressed. The inner punch 31 is for pressing the rough disc 9' on to the conical bearing surface 23 and thus converting it into a cup. This can be done simultaneously with radial deformation by pressing down the shaping punch 26, or can occur after radial deformation. FIG. 5 shows the working position in which the punches 26 and 31 have both been pressed down into the end position and the spring plate 9 has already received its final compressed cup shape.

I claim:

1. A method of producing a spring plate which comprises the sequential steps of
   (1) providing a flat plate made of a spring-plate material, said flat plate having a predetermined thickness,
   (2) punching an annular rough plate from said flat plate, said rough plate being defined by generally radially-extending webs having inner ends and outer ends, inner bridges connecting the inner ends of alternating pairs of said webs and outer bridges connecting the outer ends of the alternating pairs of said webs whose inner ends are unconnected, the inner bridges providing an inner edge for the rough plate and the outer bridges forming an outer peripheral edge for the rough plate, said inner and outer bridges and said webs providing a meander configuration to said rough plate, said rough plate defining an imaginary plane and an imaginary center, and
   (3) deforming said rough plate by engaging the outer peripheral edge and radially pressing thereon toward said imaginary center and compressing said rough plate along said imaginary plane until spacings between the outer ends of said webs and spacings between the inner ends of said webs are at least 10% less than said predetermined thickness, thus forming said spring plate.

2. A method as defined in claim 1, including, after step (3), the step of bending said spring plate into a frusto-conical shape.

3. A method as defined in claim 2, wherein during step (3) said spring plate is simultaneously bent into a frusto-conical shape.

* * * * *